United States Patent Office 3,360,907
Patented Jan. 2, 1968

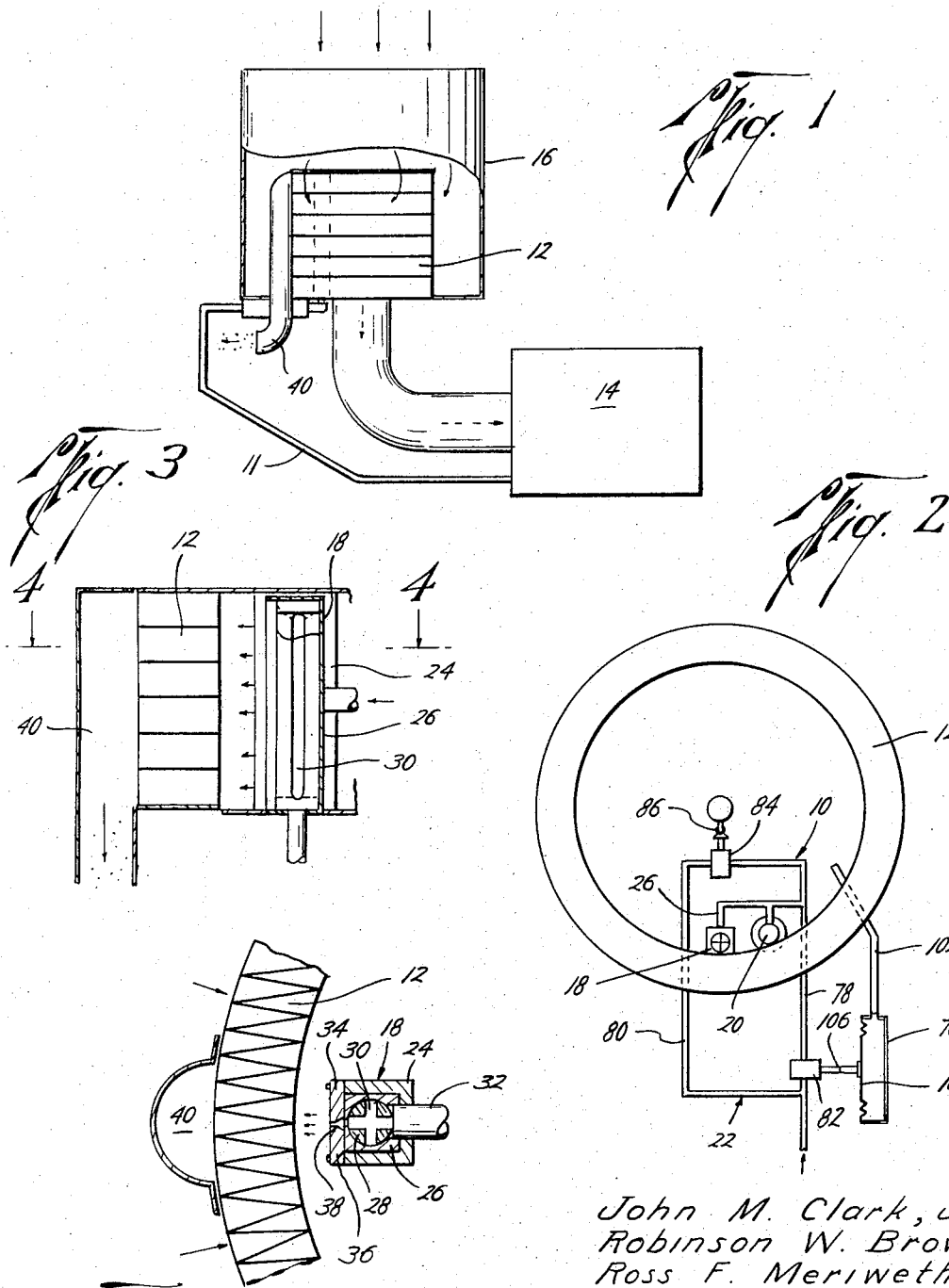

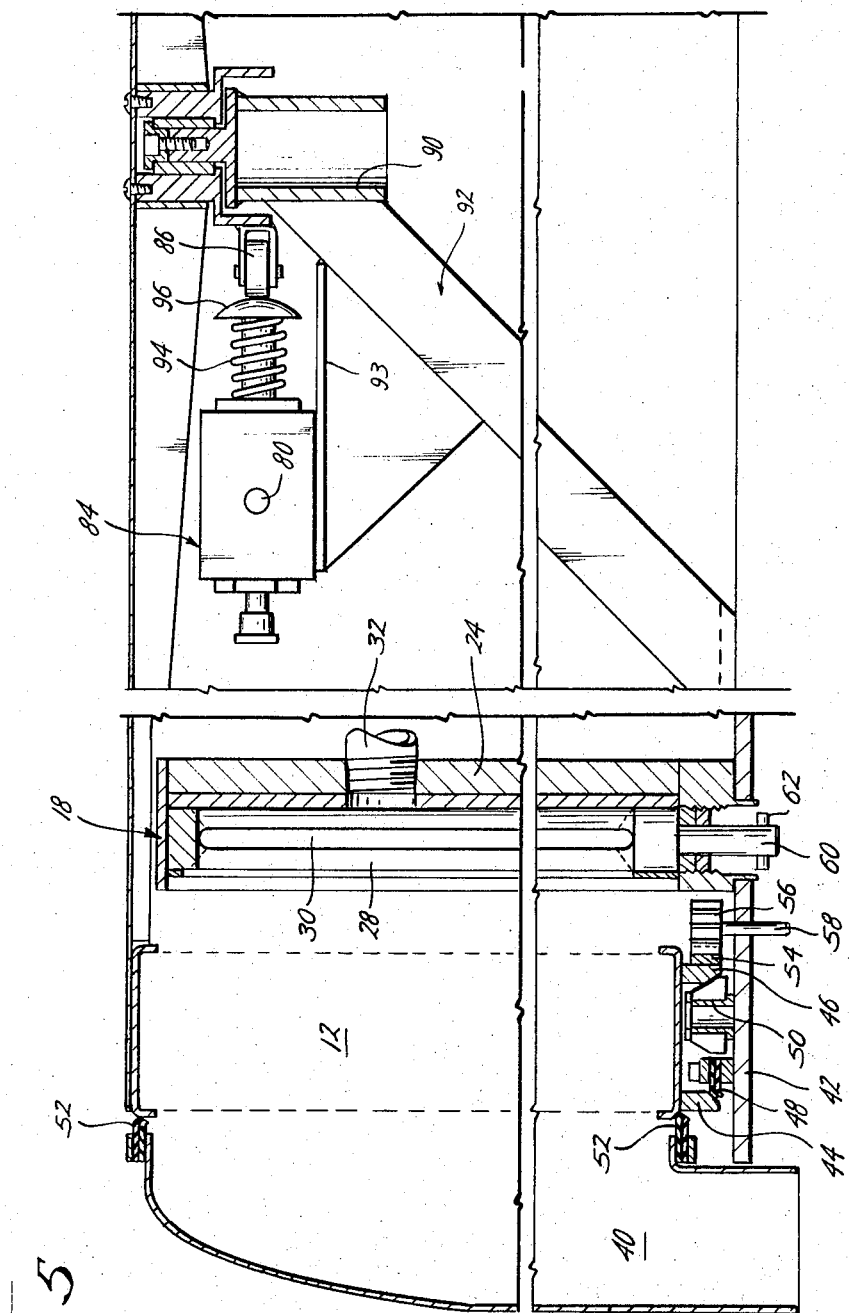

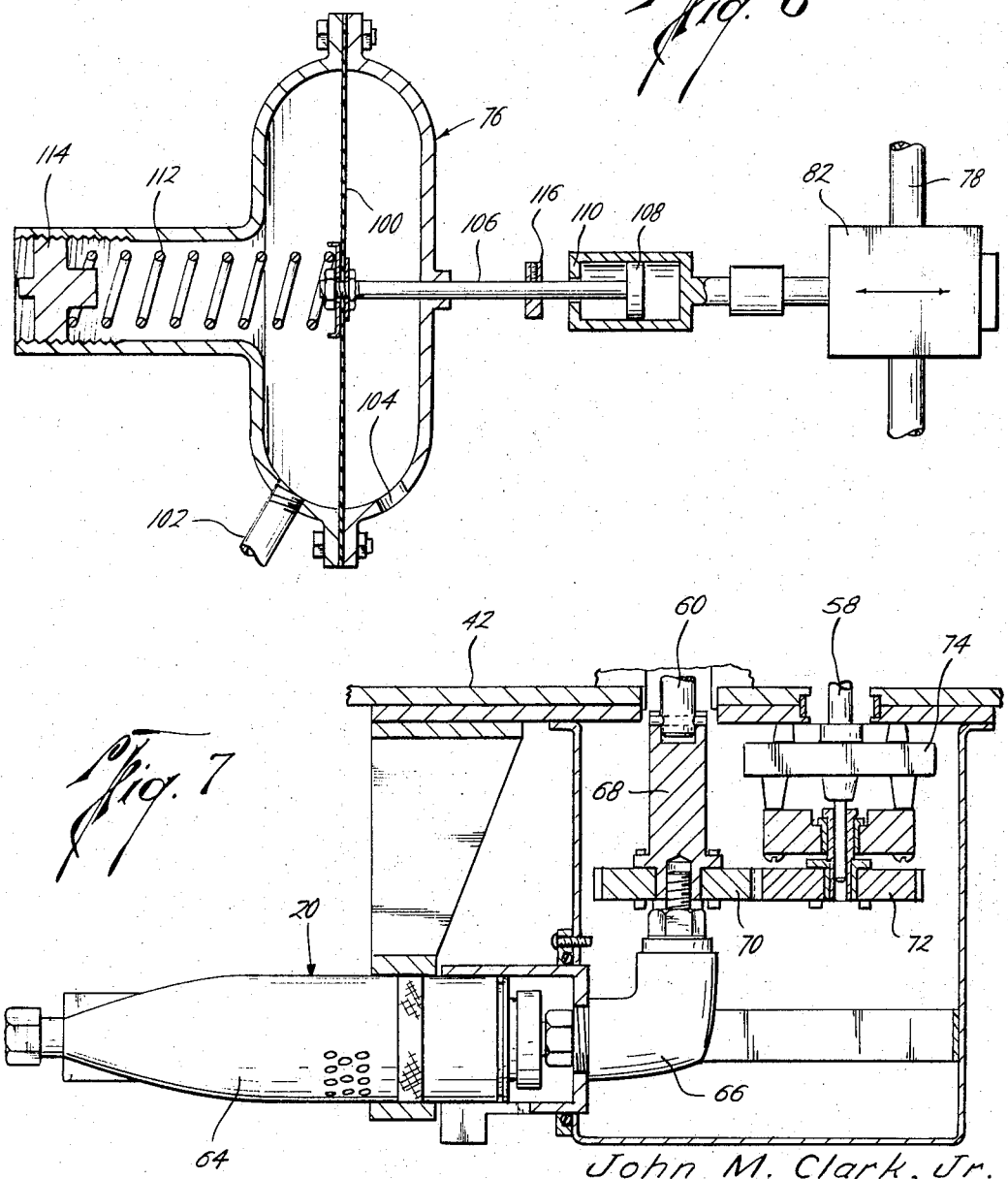

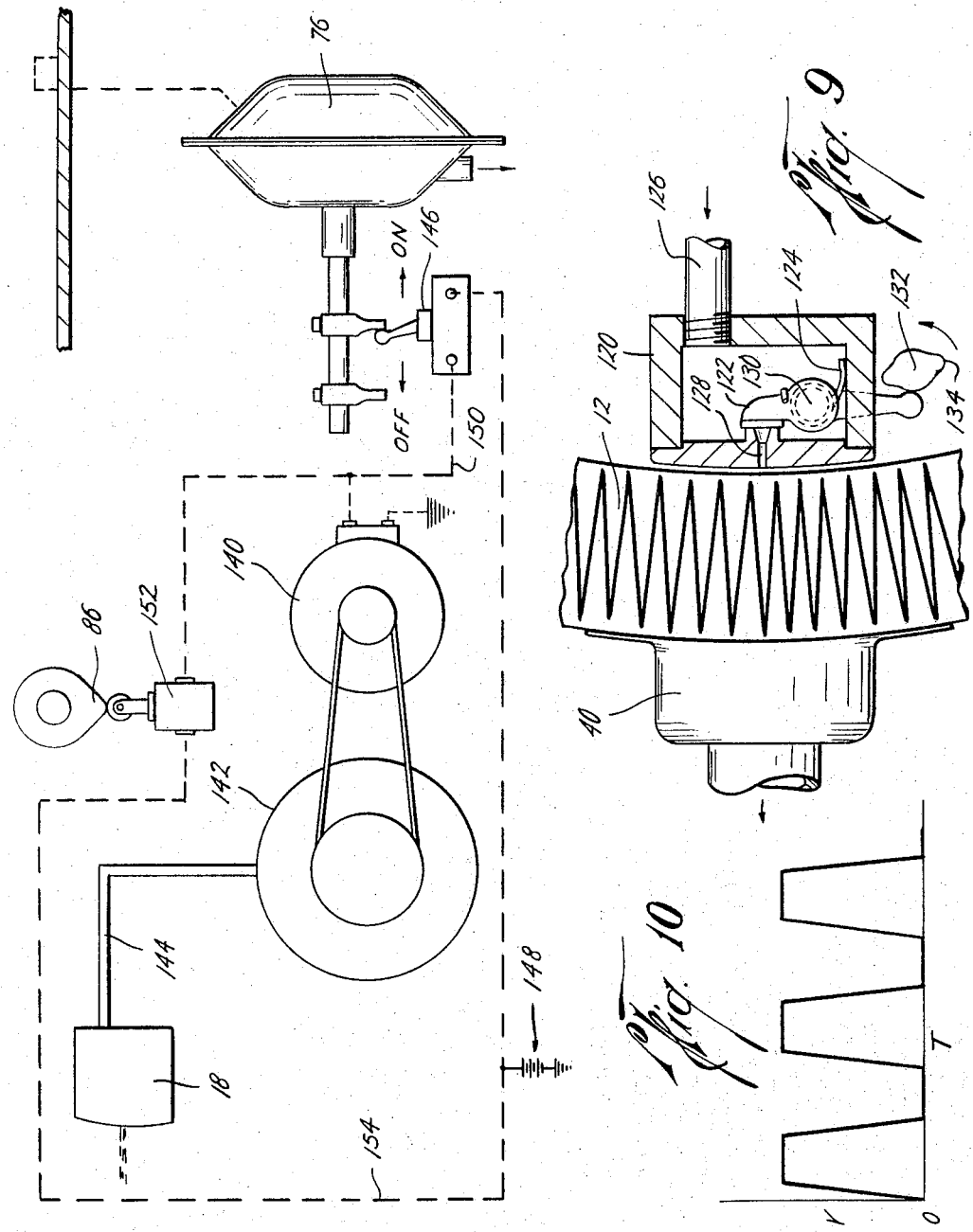

3,360,907
APPARATUS FOR CLEANING FILTERS
John M. Clark, Jr., Robinson W. Brown, and Ross F. Meriwether, San Antonio, Tex., assignors to Southwest Research Institute, San Antonio, Tex., a non-profit corporation of Texas
Filed Oct. 17, 1963, Ser. No. 317,023
5 Claims. (Cl. 55—283)

The present invention relates to an apparatus for cleaning filters, and more particularly, relates to improvements in a filter cleaning apparatus by backflushing the filter with air in such a manner that the filter is vibrated substantially at its natural mechanical resonance frequency to dislodge and remove the deposits on the filter.

A high efficiency gas filter, under heavy duty operations, will rapidly decrease the gas flow through the filter. Therefore, it is important that the filter be cleaned often and efficiently to prevent undersirable pressure drops across the filter. For example, tests have revealed that gas turbines are highly vulnerable to erosion by light concentrations of dust in the size range as fine as 0–5 microns. Since the output of a gas turbine is sensitive to lowered density of the air at its intake, and since a high efficiency air filter will block air off rapidly as it is operated in heavy dust-laden environments, it is necessary to clean the filter at frequent intervals to prevent excessive power losses. In the past, one method and means of cleaning a filter has been to "backflush" the filter to dislodge the embedded particles from the filter medium. The present invention is directed to improvements in such a method and means for cleaning filters.

It is a general object of the present invention to provide a means for cleaning a filter by backflushing the filter with pulses of air, providing relative movement between the air pulses and the filter wherein the air is directed against the filter at a frequency substantially the same as the natural resonant frequency of the filter.

Yet a further object of the present invention is the provision of an apparatus for cleaning filters using a high pressure sharp-edged air pulse which is essentially a square wave for excitation of the filter medium at approximately the natural resonant frequency of the filter.

A still further object of the present invention is the provision of an apparatus for cleaning a filter by providing a valve which discharges pulses of air directly against the filter and induces a secondary air flow from the air adjacent the filter thereby increasing the actual volume of air impinging on the filter to aid in dislodging the particles therein.

Still a further object of the present invention is the provision of an apparatus for cleaning a filter by providing a tubular filter which will normally draw gas in through the sides but not the ends, and to clean the filter by backflushing it from the inside with high pressure air directed in pulses at a frequency which will cause the filter to vibrate at substantially its natural resonance frequency to dislodge the particles, and to rotate the tubular filter relative to stationary air pulses which are provided along a line parallel to the axis of the tubular filter thereby cleaning and dislodging the particles from the filter.

Still a further object of the present invention is the provision of an apparatus for cleaning a filter by providing an extremely narrow backflushing orifice located adjacent the filter which provides the necessary air pulses to vibrate the filter substantially at its natural resonant frequency but yet conserves the backflushing air such that the air supply may be drawn from the compressor of the gas turbine thereby providing a self-contained air filter requiring no external power input.

A still further object of the present invention is the provision of an apparatus for cleaning a filter wherein, upon a predetermined pressure drop crosses the filter, high pressure sharp-edge air pulses are directed against the filter, the pulses having a frequency substantially the same as the natural resonant mechanical frequency of the filter, directing the air pulses against the normal direction of gas flow through the filter, and moving the filter relative to the air pulses until substantially all portions of the filler have been subjected to the cleaning action of the air pulses and the pressure drop across the filter is decreased to a satisfactory value.

Still a further object of the present invention is the improvement in an apparatus for cleaning a filter by backflushing said filter with pulses of air upon a pre-determined pressure drop across the filter by moving the filter transversely relatively to the air pulses and wherein air valve means are positioned adjacent and direct air pulses directly on the filter, said air valve means having a narrow outlet orifice which provides a substantially square wave air pulse which is actuated at substantially the natural resonant frequency of the filter and is supplied with a high pressure air suuply.

Still a further object of the present invention is the provision of an apparatus for and a means of cleaning a filter by backflushing the filter with pulses of air to vibrate the filter at approximately the natural resonant frequency of the filter and to provide a control system which is actuated upon a predetermined pressure drop across the filter to move the filter relatively to the air pulses until substantially all portions of the filter have been subjected to the cleaning action of the air pulses and until the pressure drop across the filter is below a predetermined value.

Yet a still further object of the present invention is the provision of an apparatus for cleaning a tubular filter by backflushing the filter with pulses of air and includes a control system which is provided with a differential pressure measuring means for measuring the pressure drop across the filter and which actuates the air pulses and actuates power means for moving the filter relative to the air pulses, and includes means for moving the filter at least one complete revolution until substantially all portions of the filter have been subjected to the cleaning action of the air pulses.

Yet a further object of the present invention is the provision of an apparatus for cleaning a filter by backflushing the filter with pulses of air by providing valve means having an orifice from which the air pulses are directed so as to impinge directly on the filter and which require no sealing means between the valve means and the filter thereby insuring that the filter means can be used upon various types and shapes of filter media.

Other and further objects, features and advantages of the invention will be apparent from the following description of presently preferred embodiments of the invention, given for purposes of disclosure and taken in conjunction with the accompanying drawings, where like character references designate like parts throughout the several views, and where, FIGURE 1 is a diagrammatic elevational view, partly in cross-section, illustrating the use of the present invention in conjunction with a filter on a gas turbine, FIGURE 2 is a schematic diagram illustrating the operation and control of the present invention, FIGURE 3 is a fragmentary cross-section elevational view, illustrating one form of valve means providing the air pulses for cleaning a filter, FIGURE 4 is a cross-sectional view taken along the line 4—4 of FIGURE 3, FIGURE 5 is an enlarged fragmentary cross-sectional view showing the mechanism for rotating the filter transversely around the air valve, and showing the control means for insuring that the filter is backflushed for at least one complete revolution, FIGURE 6 is an enlarged elevational view, partly in cross-section, showing the details and construction of a pressure differential control mechanism of the present invention, FIGURE 7 is an enlarged fragmentary cross-sectional view showing the details of the mechanism for rotating the air valve means and for rotating the filter, FIGURE 8 is a schematic diagram illustrating the provision of a modified type of control circuit which is used when it is necessary to provide an auxiliary air supply source, FIGURE 9 is a top fragmentary view, partly in cross-section, illustrating a modified type of valve means for providing the air pulses to clean the filter, and FIGURE 10 is a graph showing the shape of the air pulses used to clean the filter.

While the filter cleaning apparatus of the present invention may be utilized to clean various types of gas filters, the present invention will presently be described, by way of example only, as cleaning an air filter on a gas turbine to illustrate the feature of the use of backflushing air which is drawn from the turbine compressor, and thereby provides a self-contained air filter cleaning mechanism which requires no external power sources.

Referring now to the drawings, and particularly to FIGURES 1-4, the general aspects of the present invention can best be seen. As thus seen in FIGURE 2, numeral 10 generally designates the apparatus of the present invention for cleaning a filter 12 such as a tubular drum type filter. By way of example only, filter 12 may, as best seen in FIGURE 1, be used on the air intake of a gas turbine 14 in which the air may be drawn into the air intake housing 16 and drawn through the sides, but not the ends of the filter 12, and directed to the gas turbine 14. The direction of the air through the filter is indicated by the arrows and as noted is drawn from the outside to the inside of the tubular or drum filter 12.

The present invention 10 generally includes an air valve means 18 which provides high pressure sharp-edged wave air pulses which are directed in a direction reversed to the direction of the air flow through the filter, thereby "backflushing" the filter, a suitable drive means 20 for pulsating the valve 18 and for rotating the filter 12 past the cleaning valve 18 to permit cleaning of the entire surface of the filter, and a control circuit 22 for controlling and actuating the rotation of the filter drum 12 when the filter is in need of cleaning.

Preferably, the control circuit 22 measures the differential pressure or the pressure drop across the filter 12 which is an indication of the accumulation of particles on the filter. Upon sensing a predetermined pressure drop the control circuit 22 actuates the drive means 20 to rotate the filter one complete revolution or a number of revolutions until the pressure drop across the filter drops below a predetermined value which indicates that the filter is satisfactorily cleaned and to simultaneously actuate the air valve 18.

Referring now to FIGURES 3, 4 and 5 the structure of one form of the air valve means 18 is best seen. The air valve 18 may include the housing 24, a bearing 26 and a rotating plug 28 which may be provided with a plurality of radial openings 30. An air supply inlet 32 is provided on the back side of the valve 18 which is of a sufficient width to extend radially from one of the radial openings 30 to the next adjacent radial opening 30 in order to insure that there is always an available supply of air to the openings 30. Orifice plates 34 and 36 may be provided on the front surface of the housing 24 and which, when adjusted relatively to each other, provide an orifice 38 which is in communication with the radial openings 30 as they rotate pass the orifice 38. It is noted that the orifice 38 is positioned adjacent and directs air directly onto the inside of the filter 12 when the valve 18 is actuated. Referring now to FIGURE 10 a plot of air velocity vs. time is shown which is a graph of the function of the valve 18. It is noted that the rotary valve 18 provides a very sharp-edged wave form which is in effect a square wave for excitation of the filter 12. The fact that the valve 18 is located adjacent the inside of the filter 12 insures that the air pulses leaving the valve 18 will remain sharp and are not damped out due to passage through other conduits.

It is also noted that there is no structure sealing off the output air pulse from the valve 18 from the surrounding air adjacent the valve 18 and the inside of the filter 12. In fact, experimentation has shown that the high velocity plane of air pulses leaving the valve 18 introduces a secondary air flow from the outside of the valve 18 and adjacent the filter 12 which increases the actual volume of air impinging on the filter 12.

Another important feature of the valve 18 is the fact that it provides air pulses that strike the filter 12 and excite it at a frequency substantially the same as the natural mechanical frequency of the filter media. Of course, this resonant frequency will vary with the filter media composition, the backing material, height of the filter, the spacing and other parameters that affect the resonant frequency of the filter media. However, resonant frequency excitation of the filter 12 increases the linear displacement of the filter media and effectively dislodges the deeply embedded particles in the filter. In addition, it is noted that the orifice 38 is an extremely narrow elongate slot. Preferably, this slot is no wider than .020 inch wide. This insures that the wave form of the air pulses will be sharp and that an excessive level of backflushing air is not needed. In fact, by utilizing a narrow orifice, which conserves the volume of backflushing air, a sufficient amount of air may be drawn from the compressor discharge (not shown) of the gas turbine 14 (FIGURE 1) through line 11 thereby making the filter cleaning apparatus a self contained, self cleaning air filter which needs no external power input and thereby enables the present invention to advantageously be used with prime movers having a self contained source of compressed air.

As best seen in FIGURES 1, 3, 4 and 5, a collector manifold 40 may be provided at the outside surface of the filter 12 to collect the dust, other particles and exhaust cleaning air and carry this particle laden air away from the filter 12.

As previously shown the pulses of air from the valve 18 backflush or clean the portion of the filter 12 which is positioned adjacent the valve 18. Therefore, in order to clean the remainder of the filter 12, relative movement must be provided between the filter 12 and the valve 18. The use of the tubular or drum filter 12 provides a structure that may be rotated whereby the entire surface of the filter may pass the cleaning orifice 38 of the valve 18 and be cleaned while the filter 12 remains in filtering position and continues its normal filtering function.

Referring now to FIGURE 5, a support plate 42 is provided on which a suitable supporting track is provided for supporting and allowing the rotation of the filter 12. Thus, a pair of rings 44 and 46 may be provided connected to the filter 12 which may slide on a sealing medium 48 and a plurality of rotatable bearings 50. Suitable seals 52 are provided at the top and bottom of the manifold 40 to suitably contain the debris cleaned from the filter. Any suitable means for rotating the filter may be provided such as an internal ring gear 54 connected to the interior of track 46 and which may be actuated by a suitable pinion gear 56 which is in turn rotated by a shaft 58 which is connected to suitable drive means will be more fully described hereinafter.

Referring still to FIGURE 5, it is noted that a drive shaft 60 is connected to the rotary plug 28 of the air valve 18 and is in turn connected to suitable drive means to provide rotation of the valve, as will be more fully discussed hereinafter.

Referring now to FIGURE 7, the drive mechanism 20 for actuating both the air valve 18 and for rotating the filter 12 is best seen. Power means such as a conventional air vane motor 64 may be provided which is in turn connected to an angle drive 66. A shaft 68 is connected to the angle drive 66 and is in turn connected to air valve drive shaft 60. And suitable speed reducing gears 70 and 72 and a further speed reducing gear train 74 is provided for connection to the drive shaft 58 for rotating the filter 12. Thus, when a suitable source of air is applied to the air motor 64 the air valve 18 is rotated to provide the air pulses for cleaning the filter 12 and simultaneously the filter 12 begins to rotate relative to the valve 18 to insure that the entire surface of the filter 12 is cleaned.

Referring now to FIGURE 2, a schematic diagram of the control system 22 for controlling the rotation of the filter 12 and the actuation of the air valve 18 is best seen. First, a differential pressure measuring means 76, such as a diaphragm valve, may be used to sense the pressure differential or pressure drop across the filter 12 which is a measure of whether the filter is in need of cleaning, that is, whether the filter is clogged with particles. Thus, the differential pressure control means 76 insures that the filter is cleaned when it is in need of cleaning, but is not subjected to the deteriorating effect of high velocity air backflushing pulses during periods when there is only a small pressure drop across the filter. Two parallel air circuits 78 and 80 are provided to the air valve 18 and to the power means 20. Circuit 78 is controlled by a two way valve 82, which is normally closed, but which is in turn actuated by the differential diaphragm valve 76. Thus, upon the detection of a predetermined pressure drop across the filter 12, valve 82 is actuated to supply a suitable source of air to the air valve 18 and the power means 20 to start the cleaning action of the filter 12. Once a portion of the filter 12 has been cleaned the pressure drop across the filter may decrease a sufficient amount to close valve 82 and the course of air which is being supplied to circuit 78. Preferably, in cleaning the filter 12 it is desirable to clean the filter in complete revolutions so that all portions of the filter are equally cleaned. Therefore, a parallel circuit 80 is provided which includes valve 84 which is held normally in a closed position by cam 86. However, once the rotation of the filter 12 has been initiated the cam 86 which rotates with the filter moves away from the valve 84 allowing valve 84 to open and complete a second air circuit to the air valve 18 and the power means 20. Thus, filter 12 will rotate and be cleaned even if circuit 78 is closed until the cam 86 has rotated a complete revolution to again close valve 84 and stop the source of air to the power means and to valve 18. Of course, even after a single revolution if the pressure drop across the filter 12 has not been reduced the rotation of the filter 12 will continue for another revolution as the valve 82 and thus circuit 78 will remain open.

Referring again to FIGURE 5, the details of actuation of the conventional two way valve 84 is best seen. The filter 12 is supported on an axial shaft 90 by suitable supports 92 and revolves on said shaft. The valve 84 is stationary and may be supported by the support structure 93 adjacent a cam or roller 86 which is connected to and rotates with the filter 12. A spring 94 yieldably urges an actuating plunger of the valve 84 to an open position so as to open the circuit 80. However, in the initial position the cam 86 contacts actuating plunger 96 on the valve 84 to hold the valve 84 in a closed position. However, as soon as the filter 12 and the cam 86 are moved, the cam will move off of the plunger 96 allowing the valve 84 to be opened by the spring 94 and remain open until the cam 86 completes a revolution.

Referring now to FIGURE 6, the details of construction of a suitable differential measuring mechanism 76 such as a diaphragm valve is best seen. The differential pressure measuring valve 76 includes a diaphragm 100. The diaphragm 100 is in communication by a conduit 102 to the inside of the filter 12 thereby measuring the pressure inside of the filter. On the second side of the diaphragm 100 a vent 104 to atmosphere is provided whereby the position of the diaphragm is affected by the pressure drop or differential pressure across the filter 12. A plunger 106 is connected to the diaphragm 100 and actuated thereby and in turn actuates a movable shoulder 108 which when moved to the left engages shoulder 110 and opens a conventional two way valve 82 to provide a source of air in the circuit 78. Since the diaphragm moves against an adjustable spring 112, it is obvious that the opening differential pressure is determined by the pre-load set on the spring 112 by an adjusting nut 114. For closure of the valve 82 an adjustable set collar 116 is provided connected to the plunger 106. As the plunger 106 moves in the right hand direction the adjustable set collar 116 will contact the shoulder 110 and actuate the valve 82. The closing pressure at which the diaphragm valve 76 actuates the valve 82 is determined by the position of the adjustable set collar 116. Therefore, moving the adjustable set collar 116 to the left provides more lost motion and widens the gap between the opening and closing pressure sensed by the valve 76 before it actuates the valve 82.

Referring now to FIGURE 9, a modified air valve 120 is provided which is desirable under certain conditions such as no lubrication and high temperatures. The air valve 120 which utilizes an elongated poppet valve 122 which is advantageous as having no rubbing surfaces between valve and seat which require oiling and thereby insures that the valve will function under all conditions to backflush the filter 12. Thus, the poppet valve 122 is held normally closed by a spring 124 and is also held in closed position by the air pressure entering the air inlet 126 to the valve 120. A narrow elongate orifice 128 is provided to have the characteristics of orifice 38 previously described in connection with valve 18. The poppet valve 122 is conventionally pivoted about a shaft 130 and is actuated by a cam 132 from outside of and at one end of the valve body. The frequency of operation of the poppet valve 122 may be controlled by changing the rotational speed of the cam 132 or changing the number of lobes 134 on the cam. Another advantage of poppet valve 122 is the very limited amount of lift necessary to provide full air flow through the narrow discharge orifice 128.

As has previously been mentioned when the filter is used with a gas turbine or other prime mover which has a self contained source of compressed air, this compressed air may be used as the source for providing the motive force, as best seen in FIGURE 2 as to the filter rotating motor 20 and to the air valve 18. However, in other uses of the filter it may be desirable to provide a control circuit which provides its own air at least for the air valve 18. Referring now to FIGURE 8 such a control circuit is shown wherein an electric motor 140 is provided to drive an air compressor 142 to provide a source of air to a conduit 144 to the air valve 18. In addition motor 140 is suitably geared (not shown) to rotate shaft 58 (FIGURE 5) and rotate filter 12. In this case an electrical control circuit may be used wherein a first electrical switch 146 is provided and controlled by differential measuring means 76 to actuate a voltage source 148 to energize the electrical motor 140 through an electrical circuit 150. A two-way electrical switch 152 is provided in a parallel electrical circuit 154 to control the cycling of the filter through a complete revolution by means of the cam 86.

Thus, the present invention provides a highly efficient apparatus which senses when the filter needs to be cleaned and performs the cleaning operation. By way of example only, in using a 30 inch diameter filter that is 8 inches high and 2 inches thick, an air valve may be provided having 2400 air pulses per minute and the filter drive time to provide a complete revolution in 14 minutes. The differential valve 76 is set to actuate the control circuit 22 on a pressure drop across the filter of six inches of water. The air valve was provided with an 8 inch elongate orifice that was .008 inch wide and was supplied with an air pressure of 40 p.s.i.g. When the back-flushing valve and filter rotating mechanisms were in operation the air used was only one percent (1%) of the total high pressure air generated by the turbine compressor on which the filter was located. In such an installation it was found that one complete revolution reduced the pressure drop across the filter to almost its original value, thereby insuring that the life of the filter will be considerably extended because of the lack of any substantial residual filter plugging.

In use, the pressure measuring means 76 measures the pressure differential or pressure drop across the filter 12. Thus as best seen in FIGURES 2 and 6, the diaphragm 100 is connected to a conduit 102 to measure the pressure inside the filter 12. A vent 104 on the other side of the diaphragm 100 provides that the diaphragm is measuring the pressure differential or pressure drop across the filter 12. Upon the occurrence of a pressure drop of a predetermined amount thereby indicating the plugging of the filter by the particles, the shaft 106 will be actuated to cause movable shoulder 108 to contact shoulder 110 and actuate the normally closed two-way valve 82 allowing air to enter air circuit 78 to the power means 20 and to the inlet of air valve 18.

As best seen in FIGURES 3, 4 and 5, air is supplied from circuit 78 to a conduit 32 at the rear of the rotary valve 28 to supply the cleaning air supply to the valve 18. Since the air supply 32 is at all times in communication with the openings 30, high pressure and substantially square wave air pulses are directed out of the nozzle 38 and impinge against the inside of the filter in a direction counter to the normal flow of air through the filter when the rotary valve 18 is rotated. The air pulses are provided at a frequency to excite the filter 12 substantially at the natural mechanical resonance frequency of the filter media thereby dislodging and blowing out the particles in the filter. The frequency of rotation of the rotary openings 30 is controlled by rotation of the shaft 60 (FIGURE 5) through drive motor 64 (FIGURE 7). At the same time that the supply air is introduced into the valve means 18 and to the motor 64, the filter 12 will be rotated across the orifice 38 of the valve 18 by the motor 64 so that the entire surface of the filter 12 will be cleaned. Thus, referring to FIGURES 5 and 7, when air is applied to the air motor 64 power is applied through gears 70 and 72 and to a gear reduction unit 74 to rotate shaft 58 which in turn rotates gear 56 to cause ring gear 54 and thus the filter 12 to rotate past the air valve 18.

As soon as the filter 12 is rotated from its initial position, it is noted that the cam 86 (FIGURES 2 and 5) also rotates and moves from its initial position thereby opening valve 84 and establishing a second source of air through circuit 80 to the power means 20 and the air valve 18. At the end of one complete revolution the cam 86 and filter 12 will return to their initial positions and the cam 86 will again close air valve 84. If at this time the differential pressure across the filter 12 has dropped below the predetermined value, the valve 82 (FIGURES 2 and 6) will also be closed thereby causing the rotation of the filter to cease and the backflushing of the air valve to stop and thereby indicates that the filter has been cleaned. Of course, if the differential pressure drop has not fallen below the predetermined value, the cleaning action will continue for at least another complete revolution.

It is particularly noted that the air valve 18 provides through the narrow elongate orifice 38 a very sharp edged square wave pulse for excitation of the filter. In addition, since the orifice 38 discharges the pulsed air directly onto the inside of the filter 12, it also introduces a secondary air flow from the outside sides of the valve 18 and adjacent the filter media. Thus, not only is the filter vibrated at its natural resonant frequency to thoroughly discharge the filtered particles, but a high volume of high pressure is provided to thoroughly backflush or clean out the filter.

In addition, and as best seen in FIGURE 1, a line 11 is provided from the turbine compressor 14 to provide the source of compressed air for actuating the air motor 64 and for supplying a source of air to the air valve 18. This insures that the cleaning apparatus 10 is a self contained air filter cleaner requiring no external power sources.

As previously mentioned, air valve 120, as best seen in FIGURE 9, provides a modified type of air valve using a poppet valve 122 which is actuated by cam 132 to discharge the air pulses out of orifice 128.

If a separate source of backflushing air is required a control circuit as shown in FIGURE 8 may be utilized wherein the electric motor 140 operates a compressor 142 to supply the backflushing air to the air valve 18 and simultaneously and directly rotates the filter 12 through a suitable gear arrangement (not shown). In this circuit the differential control valve 76 actuates an electrical switch 146 which in turn energizes the electrical motor 140 when the filter is in need of cleaning. A parallel electrical circuit 154 is provided through electrical switch 152 which insures that the filter will be cleaned during an entire revolution. That is, the switch 152 is closed once the filter 12 and cam 86 rotate from their initial position after which the circuit 154 continues to supply the electrical power to the motor 140 until the cam returns to its initial position and opens the switch 152 thereby de-energizing the parallel circuit 154.

The present invention, therefore, is well suited to carry out the objects and attain the ends and advantages mentioned as well as others inherent therein. While presently preferred embodiments of the invention have been given for the purpose of disclosure, numerous changes in the details of construction and arrangement of parts and steps to the process may be made which readily suggest themselves to those skilled in the art and which are encompassed within the spirit of the invention and the scope of the appended claims.

What is claimed is:

1. In an apparatus having a drum type filter, air supply means for cleaning the filter by periodically back-flushing the filter with air, and means for moving the filter transversely relative to the air supply means, the improvement in the air supply means comprising, air valve means including a housing within said filter and having one wall thereof adjacent thereto, an air supply inlet connected to the housing, an elongate narrow air outlet orifice in said adjacent housing wall, said outlet orifice being smaller than said inlet and spaced therefrom, valve means positioned adjacent the outlet orifice within the housing and arranged to be moved between open and closed positions so as to open and close communication between the air supply inlet and the air outlet orifice, said air outlet orifice positioned adjacent the filter, but spaced out of contact with the filter for directing air pulses directly on the surface of the filter, means for moving the valve means between said open and closed positions at a speed providing substantially square wave air pulses from said orifice, and at substantially the natural resonant frequency of the filter, and air pressure source means connected to the valve air supply inlet providing sufficient air pressure to the valve means for causing the filter to resonate.

2. The apparatus of claim 1 wherein the orifice is of a width of no more than 0.02 inch.

3. The apparatus of claim 1 including a control system including, means for measuring the pressure drop across the filter,
means for rotating the filter by complete revolutions upon the occurrence of a predetermined pressure drop.

4. The apparatus of claim 1 including an electrical control circuit system having means for rotating said filter for actuating said valve means and said air pressure supply means comprising,
pressure measuring means measuring the pressure drop across the filter and including electrical switch means connected in a first parallel portion of the circuit and connected to and actuated by the pressure measuring means for actuating said control circuit system upon a predetermined pressure drop,
second electrical switch means electrically connected in a second portion of the circuit parallel to first portion for actuating said control circuit system,
cam means connected to the filter and normally holding said second electrical switch means in an open position when the cam and filter are initially positioned, but which closes the second switch means and actuates the electrical control circuit when the cam and filter are moved from said initial position until the cam and filter return to said initial position.

5. The invention of claim 1 including a control system comprising,
differential pressure means measuring the pressure drop across said filter,
power means for moving said filter transversely relative to said valve means,
a first valve means controlled by said differential pressure means and admitting a supply of air to said valve means and power means through a first supply line,
a second valve means admitting a supply of air to said valve means and power means, and
cam means connected to said filter and actuating said second valve, said cam means maintaining said second valve means in a closed position when the filter and cam are in an initial position, but allowing said second valve means to remain open when said cam and filter are moved from said initial position, and until said cam is returned to said initial position.

References Cited

UNITED STATES PATENTS

| | | | |
|---|---|---|---|
| 280,828 | 7/1883 | Howes | 210—412 |
| 495,834 | 4/1893 | Powers | 251—309 |
| 1,242,576 | 10/1917 | Miller | 251—262 |
| 2,099,502 | 11/1937 | Stockdale | 210—493 |
| 2,275,958 | 3/1942 | Hagel | 210—108 |
| 2,473,501 | 6/1949 | Bahnson | 55—274 |
| 2,710,574 | 6/1955 | Runion | 55—274 |
| 2,732,912 | 1/1956 | Young | 55—293 |
| 2,765,048 | 10/1956 | Hersey | 55—294 |
| 2,980,207 | 4/1961 | Allen | 55—283 |
| 3,073,097 | 1/1963 | Hallett et al. | 55—302 |
| 3,107,386 | 10/1963 | Mandin | 15—404 |
| 3,171,436 | 3/1965 | Lowell | 251—262 |
| 3,186,389 | 6/1965 | Sylvan | 55—293 |

FOREIGN PATENTS

| | | |
|---|---|---|
| 148,799 | 10/1921 | Great Britain. |
| 580,956 | 9/1946 | Great Britain. |
| 125,118 | 4/1960 | U.S.S.R. |

HARRY B. THORNTON, *Primary Examiner.*

B. NOZICK, *Assistant Examiner.*